C. CULMAN.
CALIPERS FOR PIVOT TESTING, TRUING, AND POISING OF BALANCE STAFFS AND WHEELS.
APPLICATION FILED NOV. 23, 1917.
1,393,203.
Patented Oct. 11, 1921.
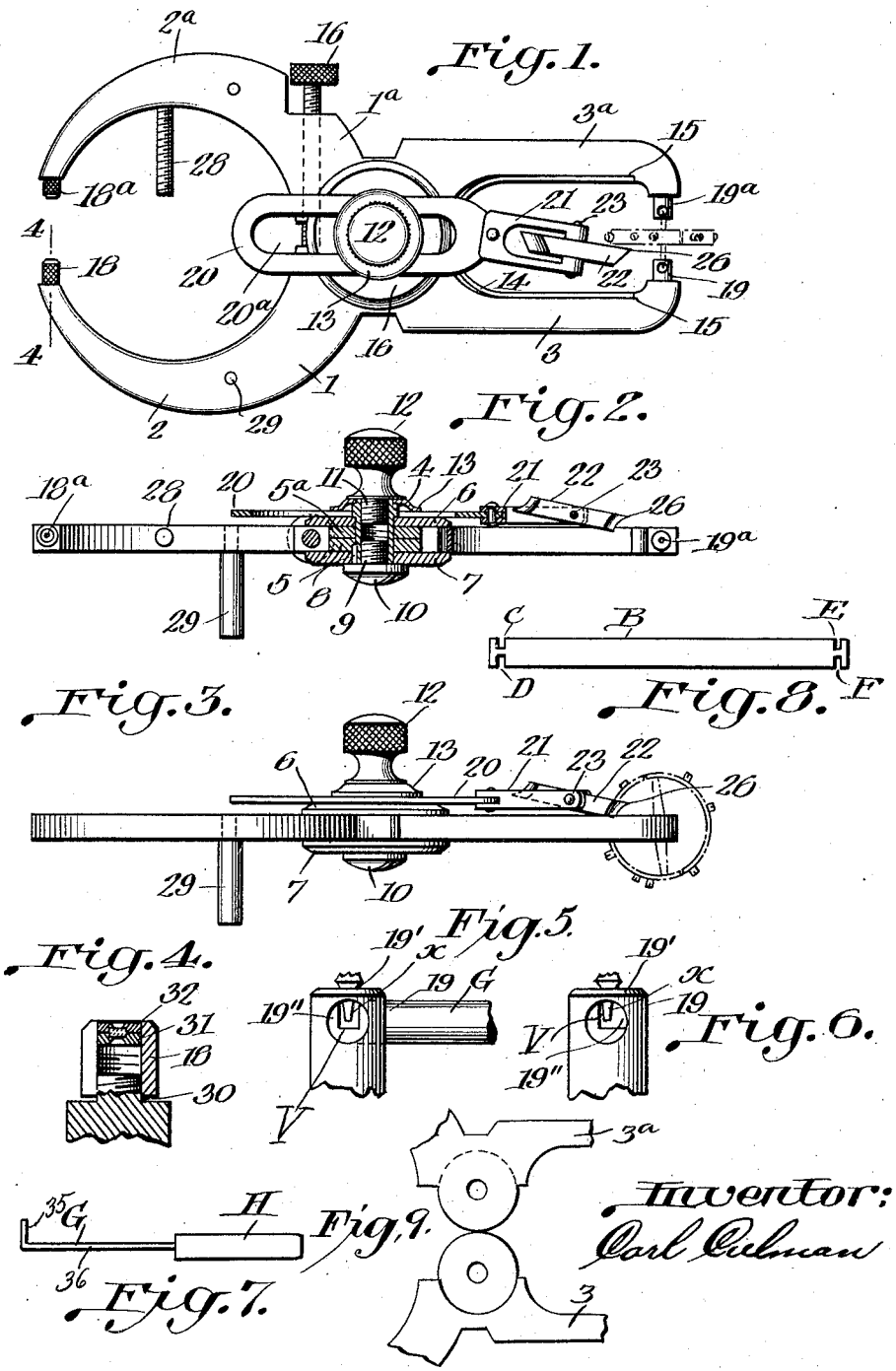

UNITED STATES PATENT OFFICE.

CARL CULMAN, OF MAPLEWOOD, MISSOURI.

CALIPERS FOR PIVOT TESTING, TRUING, AND POISING OF BALANCE STAFFS AND WHEELS.

1,393,203.

Specification of Letters Patent.   Patented Oct. 11, 1921.

Application filed November 23, 1917.   Serial No. 203,641.

*To all whom it may concern:*

Be it known that I, CARL CULMAN, a citizen of the United States, residing at Maplewood, in the county of St. Louis and State of Missouri, have invented certain new and useful Improvements in Calipers for Pivot Testing, Truing, and Poising of Balance Staffs and Wheels, of which the following is a specification.

My invention relates to combination tools used by watchmakers in testing, truing, adjusting and poising the wheels and staffs of a watch or clock, these tools being usually termed calipers.

In the use of ordinary truing and poising calipers no provision is made for testing the trueness of a staff or its pivots and unless great care is taken in engaging the jaws of the calipers with the delicate pivots of a watch wheel, the pivots of the wheel are liable to be damaged.

The chances of damages are reduced by the calipers disclosed and claimed in Patent #959,699, patented May 31, 1910, and the general object of this invention is to improve upon the calipers disclosed therein, so that the parts of the calipers will work more accurately and so that defects or irregularities in the wheels and staffs or pivots being tested may be more readily discovered.

One of the specific objects of the invention is to provide means for testing the trueness and roundness of the staff pivots and for straightening of bent pivots.

Another object is to provide better means for pivotally connecting the arms of the calipers to each other and hold the arms in any adjusted position.

A further object is to provide a better means for holding the spring in place between the arms of the calipers.

A still further object is the provision of an index point holder adjustably mounted upon the truing bar and to provide in this connection a novel form of index point which is ground to the curvature of standard wheels and which is adapted both for detecting defects in the curvature of the circumference of the wheel and also irregularities in the plane of rotation due to the wheel not being set in a plane at right angles to the arbor upon which it is mounted.

With these objects in view, my invention consists in the construction, arrangement and combination of the various parts of the device, whereby the objects contemplated are attained, as hereinafter more fully set forth, pointed out in my claims, and illustrated in the accompanying drawings, wherein:—

Figure 1, is a top view of my improved calipers.

Fig. 2, is a cross sectional view of Fig. 1.

Fig. 3, is a side elevation of Fig. 1 showing a balance wheel and the index pointer in relative position.

Fig. 4 is a cross sectional view of the pivot bearing 18, enlarged on line 4—4 of Fig. 1 to show the mounting of the jewels.

Fig. 5, is a an enlarged view of the pivot bearing 19 with a pivot testing bar in position for testing a pivot.

Fig. 6, is another view of the pivot bearing 19 with another view of a pivot testing instrument in position for testing a pivot.

Fig. 7, is a side elevation of a pivot testing bar.

Fig. 8, is a side elevation of a balance truing bar.

Fig. 9, is a view showing the overlapping portions of the jaws.

Corresponding and like parts are referred to in the following description and indicated in all the views of the drawings by the same reference characters.

Referring to the drawings, the numerals 1 and 1$^a$ designate two like arms provided at corresponding extremities with the jaws 2 and 2$^a$, comprising oppositely curved or bowed portions and at their opposite extremities with jaws 3 and 3$^a$, these jaws being substantially straight except at their ends where they are inwardly bent toward each other. The two arms 1 and 1$^a$ are constructed of metal and pivoted to each other intermediate their ends by a sleeve 4 which extends through registering openings formed transversely in oppositely reduced portions 5 and 5$^a$ of the arms. When assembled, these reduced portions which are circular, overlap and permit a relative movement of the arms to open and close the jaws as desired. The sleeve 4 is somewhat longer than the combined thickness of the portions 5 and 5$^a$ and is interiorly screw threaded. Mounted upon one end of the sleeve is the washer 6 and upon the other end of the sleeve is the washer 7. Passing through the washer 7 into the portion 5 of the arm 1, is a locking pin 8. This pin intersects the outer face of the sleeve and the inner face of the perforation in the portion 5, so that the sleeve 4, the washer 7 and the portion 5 of the arm 1 are all rigidly connected together by the pin 8 which may be screw threaded for quick removal when it is desired to disassemble the parts. A driving fit of sleeve 4 into the portion 5 of arm 1, obviates the necessity of the pin 8. Engaging with one end of the sleeve 4 is the screw 9 having the head 10 while engaging with the other end of the sleeve is a screw 11 having the enlarged thumb head 12, which is knurled. This head 12 is larger than the sleeve 4 and a shoulder is thus formed on the lower face of head 12. This shoulder engages with a concavo-convex spring washer 13, which normally bears upon a truing bar, as will be described later. It will be seen, that by tightening the head 12, the arms 1 and 1ᵃ will be forced into a relatively tight frictional engagement with each other and thus held in any desired position and that by loosening the head 12 this frictional engagement will be diminished and thus the arms may be readily moved relative to each other.

In order to force the jaws 2 and 2ᵃ toward each other and the jaws 3 and 3ᵃ apart, I provide the U-shaped spring 14, having a contour approximately to that of the arms 3 and 3ᵃ so that the spring 14 will fit snugly against the inner faces of the jaws 3 and 3ᵃ and that the bowed portion of the spring will not extend across the opening of the jaws 3 and 3ᵃ as it does in the prior patent. The spring therefore will not be in the way nor will there be any liability of forcing the spring out of place by striking it against some object. The outer ends of the spring engage shoulders 15 formed at the extremities of the jaws 3 and 3ᵃ, while the middle of the bowed portion of the spring extends into the space between the washer plates 6 and 7. These washer plates hold the spring firmly in place and prevent detachment, but permit the spring to be removed when the parts are disassembled. In order to hold the jaws 2 and 2ᵃ and 3 and 3ᵃ at the proper distance from each other and against the force of spring 14, I provide the stop screw 16, which passes through a threaded transverse opening at the base of jaw 2ᵃ. The head of the screw 16 is knurled for easy manipulation, and by adjusting the screw in or out, the jaws may be held at any desired distance apart.

It will be seen, that while the stop screw 16 prevents the jaws from approaching each other beyond a certain predetermined point, the stop screw does not prevent the jaws 2 and 2ᵃ from being opened. By means of the stop screw, the jaws 2 and 2ᵃ may be so adjusted as to prevent any excessive force being applied to the pivots of a wheel held between the jaws 2 and 2ᵃ. It will also be noted, that the screw 16 forms an adjusting means for separating or bringing together the jaws 2, 2ᵃ and 3, 3ᵃ. Thus the jaws 2, 2ᵃ may be adjusted to hold a balance staff with the slightest of engagement of the pivots in the jeweled bearings while the jaws 3, 3ᵃ may be forced together by means of the screw 16 into relatively firm frictional engagement with the arbor or staff being tested in the jaws. When the arbor is so supported between the jaws 3 and 3ᵃ, pressure on the jaws 2 and 2ᵃ will not open the jaws 3 and 3ᵃ because of the stop screw 16. Therefore whether the balance wheel is supported by the jaws 2, 2ᵃ or 3, 3ᵃ, the caliper may be easily handled without danger of dropping the delicate watch member.

Secured to the extremities of the jaws 2, 2ᵃ and 3, 3ᵃ are the bearings 18, 18ᵃ and 19, 19ᵃ respectively, designed to receive the wheel pivots or arbors of the wheel being tested.

Mounted upon the calipers is a truing or index bar 20, which is used for the same purpose as the truing bar described in the prior patent, this truing bar being longitudinally slotted as at 20ᵃ to permit the truing bar to be adjusted with relation to the screw 12. The truing bar may be turned into operative relation with either of the jaws 2, 2ᵃ or 3, 3ᵃ and may be longitudinally adjusted with relation of these jaws. Pivotally mounted upon one extremity of the truing bar 20 is a pair of integral jaws 21 designed to be used in truing a watch wheel or for supporting a rotatable index pointer 22. The outer ends of the jaws 21 are inwardly turned a slight amount and passing through these jaws is a pivot pin 23, which may be screw threaded. Rotatably mounted upon upon the pin 23 is the index pointer 22 before referred to. This pointer is formed of a short bar of metal, the opposite ends of which are beveled in reverse directions, so as to form an index point or edge 26 on both ends of the index pointer. Each of the beveled faces is concavely ground to the curvature of two circles of different diameters. It will be seen, that these beveled ends are reversely disposed with relation to each other and reversible upon the pivot pin 23. Inasmuch as the index pointer is ground to the curvature of two standard wheels and is reversible, it is adapted for testing balance wheels of different diameters or having different curvatures.

It will be noted, that not only may the truing bar 20 be longitudinally and rotatably adjusted relative to the pivot bearings 18, 18ᵃ and 19, 19ᵃ, but the jaws 21 may be rotatably adjusted relative to the truing bar or horizontally relative to the wheel being tested and as the pointer 22 is rotatable at right angles to the truing bar it may be brought into any desired position parallel to and to the same curvature as said wheel, and this is not possible with the construction disclosed in the prior patent.

It is possible to use the jaws 21 alone as the means of testing the regularity of a balance wheel by removing the index 22 therefrom and setting the jaws 21 so as to embrace the rim of the wheel to be tested. The movement of the rim with respect to the jaws 21 as the wheel is rotated will then serve as an indication of the trueness of the wheel. This is convenient when the wheel is of a larger diameter than can conveniently be handled by means of the index 22.

In order to secure vibrations of the instrument so as to cause the wheel suspended between the caliper jaws to rotate, I provide the pin 28 which is minutely scored preferably by threading or knurling the pin, so that when a pointed instrument is drawn across the pin it will set up minute vibrations which will cause the suspended wheel to turn if not perfectly poised. This threaded pin, being described and claimed in the prior patent, requires no further description.

Feet or rests 29 are located upon the jaws 2, and 2ª intermediate of the pivotal point of the jaws and the pivot bearings 18, 18ª. These feet project downward any desired distance and serve to elevate one end of the calipers from the work bench during a suspension of the examination of the wheel. They are particularly designed to hold the calipers in an elevated position on a bench as best adapted to secure the proper vibrations of the free ends of the caliper jaws when poising a wheel. The thumbscrew 12 acts as an elevating means when the caliper is reversed. The instrument is used as follows:

When it is desired to test a balance wheel of a watch, the screw 16 is adjusted so that the bearings 18, 18ª or 19, 19ª, will receive and firmly hold a staff or staff pivot with the proper amount of resistance to the free revolution of the wheel. The tension of the spring 14 counteracted by the screw 16 relieves the delicately constructed staffs and staff pivots of too great and varying degrees of pressure in the hands of the operator. The balance wheel having been placed in position the bar 20 and the pointer 22 are moved close to the rim of the wheel and the wheel is then revolved. The wheel may be examined from either side of the caliper and the trueness determined and corrected, if necessary, both as regards any lateral deviations of its circumference or its angular relation to the axis. For the correction of irregularities of such wheel I provide the truing bar B, shown in Fig. 8, which has two flattened end pieces milled with different sized notches as shown in Fig. 8 at C, D. E. F.

These defects having been corrected, the wheel is again placed in position in the calipers for the purpose of determining the correctness of poise or balance. In the last mentioned operation, the calipers are preferably placed upon the work bench, the wheel supporting end of the calipers being raised from the bench by the feet or rests, thus supporting the wheel in an elevated position. In this operation the bearings 18, 18ª are preferably used which are jeweled as shown in Fig. 4, where the bushing 18 is mounted on stud 30 for holding the jewels 31 and 32, so as to offer the least amount of resistance to the free revolutions of the staff pivots. An instrument of any character drawn across the threaded or knurled pin 28 will cause or set up sufficient vibration to transmit an impulse to the wheels, carried by the before mentioned staff and pivots, to move downward by its own gravity if not correctly balanced.

The bearings 19, 19ª, Fig. 6 are preferably made of hardened steel drilled at 19' to receive the pivot of a staff and transversely drilled at 19" to receive the notched pivot testing and straightening bar G. Fig. 7. The pivot tester bar, a short pivot section 35, having a notch or groove V lengthwise thereof, and revolving freely in the hole 19", and an elongation 36, preferably at right angles to the pivot section serving as an index and wrench for detecting and correcting deflections. A small handle H is attached to G for easy manipulation of the tester, which is as follows: The pivot to be tested is placed between bearings 19, 19ª, the notched pivot of the tester is inserted in the transversely drilled hole 19" in which it rotates freely except as restricted by the engagement of the pivot to be tested with the side of the notch V. It is evident, that the normal position of the handle due to weight is vertical, but same is held in a horizontal position by the side of the notch V of the tester coming in contact with the pivot. If the pivot is true, the tester will maintain a horizontal position without defections when the pivot is rotated. If the pivot is bent, the tester will follow the bend of the pivot as same is slowly rotated and will therefore move up and down according to the bend of such pivot. To straighten the pivot, it is only necessary to exert a slight downward pressure on the handle of the tester when same has reached the highest point from a horizontal plane in following the pivot.

My improved tool is preferably made of nickel, rigid and relatively heavy.

It will be seen, that this improved tool combines the features of a truing and poising tool with a pivot testing and straightening device.

While I have shown what I believe to be the best form of my invention and one that I have found extremely effective in practice, I do not wish to be limited to this exact form, as many minor changes may be made without departing from the spirit of the invention.

Having thus described my invention, what I claim is:

1. A tool of the character described, including a pair of mutually pivoted jaws having pivot bearings in their extremities, a pin passing through the pivotal centers of the jaws, an index bar rotatably mounted upon said pin and longitudinally adjustable thereon, and an index pointer carried on the bar and angularly adjustable in two planes relative thereto.

2. A tool of the character described, including a pair of jaws having pivot bearings in their extremities, a pivot pin passing through the pivotal centers of the jaws, a slotted index bar through the slot of which the pin passes, and an index pointer carried on the bar and angularly adjustable in two planes relative thereto.

3. A tool of the character described, including a pair of mutually pivoted jaws having pivot bearings in their extremities, an index bar rotatably and longitudinally adjustable relative thereto on the pivotal center of the jaws, and an index pointer carried by the bar, said pointer being adjustable to any desired angle.

4. A tool of the character described, including a pair of mutually pivoted jaws having pivot bearings in their extremities, an index bar rotatably and longitudinally adjustable with respect to the center of the jaws, a pointer carrier pivotally mounted upon one extremity of the index bar and adjustable to any desired angle, and an index pointer pivotally mounted on the carrier and rotatably adjustable in a plane at right angles to the plane of the jaws.

5. A tool of the character described, including a pair of pivoted jaws having bearings in their extremities, an index bar carried by the jaws, and a reversible index pointer carried by the bar, both ends of the pointer being laterally beveled, both extremities of the pointer being curved to correspond to the correct curvature of standard wheels with which the wheel to be tested is to be compared.

6. An index pointer of the character described, consisting of a bar of metal, both ends of which are laterally beveled in opposite directions to form index edges, each of said edges being curved to correspond to the curvature of a standard watch wheel.

7. A tool of the character described, comprising a pair of arms pivoted to each other, the arms being reduced in thickness at the point of their engagement so as to lie in the same plane, a U-shaped spring having the contour of the inner faces of the arms and disposed against the inner faces of said arms and washer plates disposed on each side of the arms and the middle portion of the spring extending between said washers.

8. A tool of the character described, comprising a pair of arms the middle portions of the arms being reduced so that the arms may lie in the same plane, a pivot pin passing through the middle of the arms and pivoting them together, washer plates surrounding the pivot pin and located on each face of the arms, said plates projecting over the space between the arms, and a U-shaped spring having the contour of and fitting against the inner faces of the arms, the middle portion of the spring extending into the space between said washer plates.

9. A tool of the character described, including a pair of arms pivoted to each other and having shoulders on their extremities, the arms being reduced in thickness at the point of engagement so as to lie in the same plane, a U-shaped spring having the contour of the inner faces of the arms and disposed against said inner faces, the extremities of the spring bearing against said shoulders, and washer plates disposed on each side of the arms concentric to the pivotal center thereof, the washer plates projecting beyond the arms and the middle portion of the spring extending between said washer plates.

10. A tool as described, including a pair of arms, said arms crossing each other and the contacting faces of the arms being reduced so that the arms shall lie in the same plane, a tubular sleeve extending through the pivotal center of the arms, washer plates carried on the ends of the tubular sleeve, a locking pin intersecting the face of the sleeve, a washer plate and one of said arms, a binding screw, the shank of which has screw threaded engagement with the interior of the sleeve and disposed opposite said head and a spring washer interposed between the head of the binding screw and the underlying washer plate.

11. A tool as described, including two arms having reduced middle portions, the reduced portions of the arms overlapping each other, a tubular sleeve passing through the center of the arms, said sleeve being interiorly screw threaded, washer plates on each side of the arms and concentric to the sleeve, means for holding one of said washer plates to the sleeve, a binding screw having a screw threaded shank engaging the tubular sleeve, a slotted index bar through the slot of which the shank of the binding screw passes, and a concavo-convex spring washer interposed between the head of the binding screw and said index bar.

12. A tool of the character described, including a pair of arms pivoted to each other at their middles, the arms being formed with co-acting jaws having pivot bearings in their extremities, an index bar rotatably and longitudinally adjustable relative to the pivotal center of the arms, a pointer carrier upon the extremity of the index bar for movement in a plane parallel to the plane of said jaws, an index pointer pivoted to said carrier and movable in a plane at right angles to the plane of the jaws, and supporting feet projecting from the under side of each of said jaws and located between the extremities of the jaws and the pivotal center of the arms.

13. A tool of the character described, including a pair of pivoted jaws, screw means for operating and adjusting said jaws, said jaws having pivot bearings in their extremities one pair jeweled the other pair steel, drilled vertically to receive a balance staff and transversely to receive a pivot testing and straightening instrument.

14. A pivot testing instrument formed from a bar of metal having a notch, groove or slit cut out of the bar at one end, forming a sectional pivot for insertion into the transversely drilled hole of the pivot bearings of the described caliper.

15. A pivot testing instrument formed from a bar of metal bent at right angles near one end, the short end having a groove milled out of the stock forming a sectional pivot for insertion into the transversely drilled hole of the pivot bearings of the described caliper, the groove forming contact planes for testing pivots the long end of the instrument forming a handle and gage whereby deflections or bends of a pivot may be gaged.

16. A tool of the character described including a pair of pivoted arms forming coöperating jaws having spring and screw adjustment and having pivot bearings at their extremities, a longitudinally and rotatably adjustable index bar, carrying a rotatable, horizontally and vertically adjustable index pointer, changeable pivot bearings for varying sizes of staffs, jeweled bearings for poising, means for agitating the balance while poising, means for supporting the tool in an elevated position, a pivot testing wrench, a rim testing wrench cut or struck from a sheet of metal having cuts at both ends for straddling the balance rim.

17. In a pivot testing instrument having a pivot bearing or socket, an indicator, comprising, a pivot section adapted for insertion into a pivot bearing to engage the pivot, and an extension adapted to indicate a fault in the pivot.

18. In a pivot testing instrument having a pivot bearing or socket, an indicator, comprising, a pivot section adapted for insertion into a pivot bearing and having a notch adapted to engage the pivot, and an extension adapted to indicate a fault in the pivot.

19. In a pivot testing instrument having a pivot bearing or socket, an indicator, comprising, a pivot section adapted for insertion into a pivot bearing to engage the pivot, and an extension adapted to indicate a fault in the pivot and to provide a manipulative element for correcting the fault.

20. In a pivot testing instrument having a pivot bearing or socket, an indicator, comprising, a pivot section adapted for insertion into a pivot bearing and having a notch adapted to engage the pivot, and an extension adapted to indicate a fault in the pivot and to provide a manipulative element for correcting the fault.

In testimony whereof I affix my signature in the presence of two witnesses.

CARL CULMAN.

Witnesses:
M. T. O'Brien,
M. F. Fink.